UNITED STATES PATENT OFFICE.

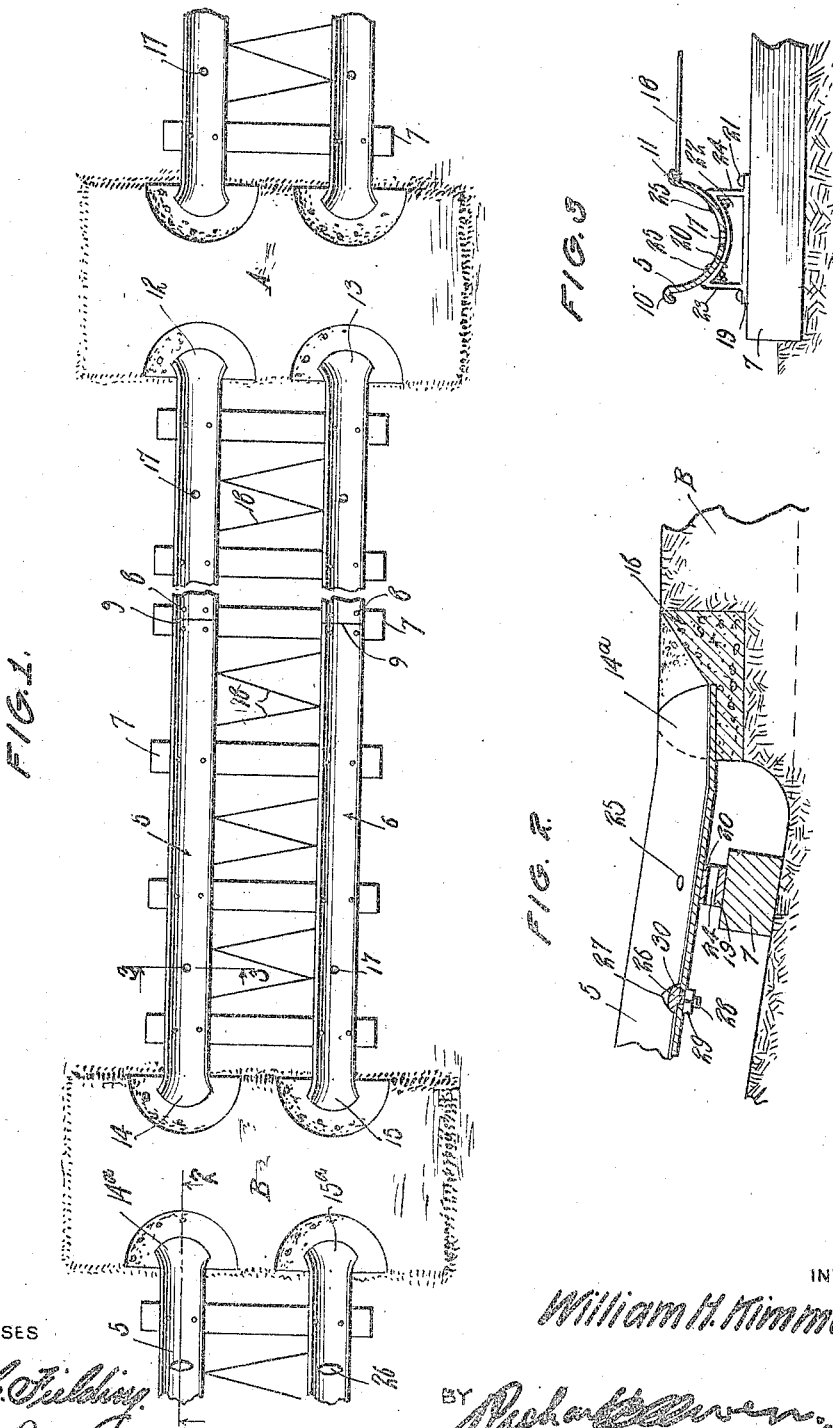

WILLIAM H. KIMMONS, OF PINON, NEW MEXICO.

AUTOMOBILE-RAILWAY.

1,264,400.  Specification of Letters Patent.  Patented Apr. 30, 1918.

Application filed December 8, 1917. Serial No. 206,210.

*To all whom it may concern:*

Be it known that I, WILLIAM H. KIMMONS, a citizen of the United States, residing at Pinon, in the county of Otero and State of New Mexico, have invented certain new and useful Improvements in an Automobile-Railway, of which the following is a specificatiton.

This invention is an automobile railway and is more particularly adapted to provide a standard right-of-way with a permanent track having turn-outs at suitable intervals so that automobiles or other types of self-propelled vehicles may travel from place to place upon a substantially built track.

One object of the invention is to provide a railway whose tracks are substantially semi-circular in cross section with rounded sides and supporting said tracks by rail chairs that are secured to spacing members.

Another object is to provide a track-way interrupted at suitable intervals with turn-outs and forming the track with flared or enlarged ends that serve as guides to direct the wheels of the vehicle on the track.

Still another object is to provide a rail chair having a substantially flat base and a curved upper surface to engage with a support to hold the track clear of the spacing members such as ties.

A further object is to provide tracks with suitable renewable inserts placed in the bottom of the groove that will serve as grips with which the tire may engage to increase the traction as when climbing hills.

A still further object is to provide a trackway that will be simple and strong in construction to provide a means for permitting self-propelled vehicles to travel from place to place upon a right-of-way that may be maintained in good order at a minimum of cost, one that may be kept clear of obstructions and be substantially independent of climatic conditions and providing suitable turn-outs at intervals so that the vehicles may leave the track-way at convenient points.

Broadly stated the invention comprises a track-way formed of two parallel tracks that are semi-circular in cross section and are provided with rounded edges, interrupting the longitudinal length of the track-way at suitable intervals to form turn-outs for the vehicles, and forming the ends of the rails so that they may serve as guides for directing the wheels of a vehicle on the track securing and supporting the rails by rail chairs, and upon inclines, placing suitable grips in the bottom of the groove of the rail, so that the traction of the wheels may be increased, and also providing the rails longitudinally with suitable drain holes, said rails and chairs being suitably mounted upon spaced members such as ties to elevate the track-way.

One practical form of construction and assembly will be described and illustrated in the accompanying drawings, in which:—

Figure 1 is a top plan view of sections of the track way, and showing the turn-outs, Fig. 2 is a sectional view on the line 2—2 of Fig. 1, and Fig. 3 is a sectional view on the line 3—3 of Fig. 1.

In the preferred embodiment about to be described the track-way is shown as being constructed of the rails 5 and 6 that are supported upon suitable chairs secured to the ties 7. The rails as indicated at 5 and 6 may be each formed of suitable lengths and they may be joined together in any suitable or workmanlike manner as indicated, for example by the rivets 8. The joint itself being indicated at 9 may be of the butt type.

The rails are substantially alike in construction and form, and therefore only one rail will be described. The rail 5 may consist of several lengths suitably joined together as before described and this rail extends over a certain distance. The rail 5 is preferably semi-circular in cross section and is provided with the arc curved edge portions 10 and 11 as shown more particularly in Fig. 3.

At suitable intervals the rails 5 and 6 forming the track-way are interrupted to form turn-outs indicated at A and B. The rails 5 and 6 at these points are provided with flared or enlarged ends 12, 13, 14, 14ª, 15, and 15ª. Adjacent the flared ends the turnouts are provided with concrete abutments 16 that are adapted to coöperate with each one of the flared ends. As shown more particularly in Fig. 1 these concrete abutments are semi-circular in plan and the upper surface preferably slants downward toward the flared end of the rail. The slant of the abutment 16 is more clearly shown in Fig. 2 while the form in plan is shown more particularly in Fig. 1.

The rails may be provided with suitable drain holes 17 that will permit any water that might accumulate in the groove to freely pass outward. To maintain the rails 5 and 6 spaced apart and also to provide strength and rigidity the cross braces indicated at 18 may be employed. These cross braces 18 may be suitably secured to the arc curved edge portion 11 as shown in Figs. 1 and 3.

The rails 5 and 6 are preferably supported upon rail chairs that may have a flat base 19 and a curved upper surface 20. The flat base 19 may have suitable flanges through which may pass any suitable fastening means such as the spikes 21. The curved upper surface 20 may be formed as a flange that may be secured to the web portion 22 that extends upward from the flange 19. The side walls 23 and 24 are preferably vertical and are of the same width as the flange 19 and the upper surface 20. Thus the rail chair provides a maximum of strength to support the rail 5. To secure the rail to the chair any usual means may be employed such as are indicated by the bolts 25.

In Fig. 2 the track is shown as going up an incline and in order to provide for increasing traction the bottom of the groove of the track is provided with suitable friction increasing means. This means may be formed in any suitable way but it is preferred to make them so that they are renewable at little cost and with the expenditure of a small amount of labor. As shown, the grips are composed of a body portion 26 that may be substantially elliptical in outline and provided with a top that is more or less pointed as indicated at 27.

The under surface of the body 26 is preferably flat and from this surface there extends a threaded stem 28 that is adapted to be engaged by a nut 29. To provide for fastening the grip to the rail, the rail is provided with a suitable hole 30. These may be arranged so that the grips are placed in a staggered relation or in alinement with each other as shown in Fig. 1.

The track-way such as has been described would be practically permanent in character and would provide a convenient means for traveling from place to place. It would not be subjected to climatic conditions such as the ordinary road nor would it require extensive repairs or renewals to maintain it in proper condition. Its road surface would be substantially smooth and continuous and the ends of the rails being embedded in concrete abutments would provide convenient and suitable means for permitting the vehicle to leave the track-way at the turn-outs.

The rails 5 and 6 may be formed of suitable material and should be of sufficient depth to accommodate an ordinary wheel and the width of the groove should be sufficient to take care of all diameters of tires. The rails being semi-circular in cross section thus provide a rounded surface with which the tire may engage. By having the rails of sufficient depth it would not require as much attention in steering as upon the common road as the wheels of the vehicle would be more or less guided by the trackway.

What I claim is:—

1. A device of the type described which comprises a track-way composed of lengths of rails semi-circular in cross-section and having recurved edge portions, said trackway being interrupted at intervals to provide turn-outs, said rails at the turn-outs being flared and provided with guide ways adjacent their ends, and means for supporting and securing said rails.

2. An automobile railway which comprises a track-way composed of longitudinally joined rails that are semi-circular in cross-section and have rounded sides, said track-way being interrupted at intervals to provide turn-outs, the rails at the turn-outs being enlarged and flared to form guides to direct the wheels of a vehicle onto the rails, removable and renewable means secured at the bottom of the rail for increasing the wheel traction, and means for supporting and securing the rails in alinement upon spaced ties.

3. An automobile railway which comprises a track-way composed of trough like rails that are joined together to form continuous lengths, turn-outs at suitable spaced intervals having concrete abutments for receiving the ends of the rails, said abutments being semi-circular in outline, the upper face slanting downward to the rail, said rails being provided with flared and enlarged ends serving as guides, rail chairs for securing and holding the rails on spaced tie members, and means for increasing the traction of the automobile wheels.

4. An automobile railway which comprises a track-way composed of lengths of rails semi-circular in cross-section and having recurved edge portions, means for bracing the rails against transverse movement, and means for supporting the rails out of contact with the ground and for securing the rails to ties.

In testimony whereof I affix my signature in presence of two witnesses.

WILLIAM H. KIMMONS.

Witnesses:
 ROBERT W. WEST,
 CHARLES E. COPE.